United States Patent
Kwan

(10) Patent No.: US 8,254,725 B2
(45) Date of Patent: Aug. 28, 2012

(54) APPARATUS, METHOD AND SYSTEM FOR ELONGATING PIXEL DATA

(75) Inventor: Sik Piu Kwan, Suwanee, GA (US)

(73) Assignee: NCR Corporation, Duluth, GA (US)

( * ) Notice: Subject to any disclaimer, the term of this patent is extended or adjusted under 35 U.S.C. 154(b) by 605 days.

(21) Appl. No.: 12/510,493

(22) Filed: Jul. 28, 2009

(65) Prior Publication Data

US 2011/0025867 A1    Feb. 3, 2011

(51) Int. Cl.
*G06K 9/32* (2006.01)
(52) U.S. Cl. .............. 382/299; 235/472.01; 250/216; 348/143; 348/311
(58) Field of Classification Search .............. None
See application file for complete search history.

(56) References Cited

U.S. PATENT DOCUMENTS

| | | | |
|---|---|---|---|
| 6,486,909 B1* | 11/2002 | Pirim ........................... 348/143 |
| 2003/0098352 A1* | 5/2003 | Schnee et al. ............ 235/472.01 |
| 2009/0045326 A1* | 2/2009 | Sato et al. ..................... 250/216 |
| 2009/0059050 A1* | 3/2009 | Sakamoto ..................... 348/311 |
| 2011/0249889 A1* | 10/2011 | Kothandaraman et al. ... 382/154 |

* cited by examiner

*Primary Examiner* — Anand Bhatnagar
*Assistant Examiner* — Tsung-Yin Tsai
(74) *Attorney, Agent, or Firm* — Harden E. Stevens, III

(57) ABSTRACT

A device, methods and system for improving the contrast ratio of an image of an optical code captured by an image capture device. A command implemented by the image capture device of the form "shift and add" causes the image capture device to generate a modified row of pixel data having improved contrast from a plurality of pixel rows in the image capture device.

21 Claims, 8 Drawing Sheets

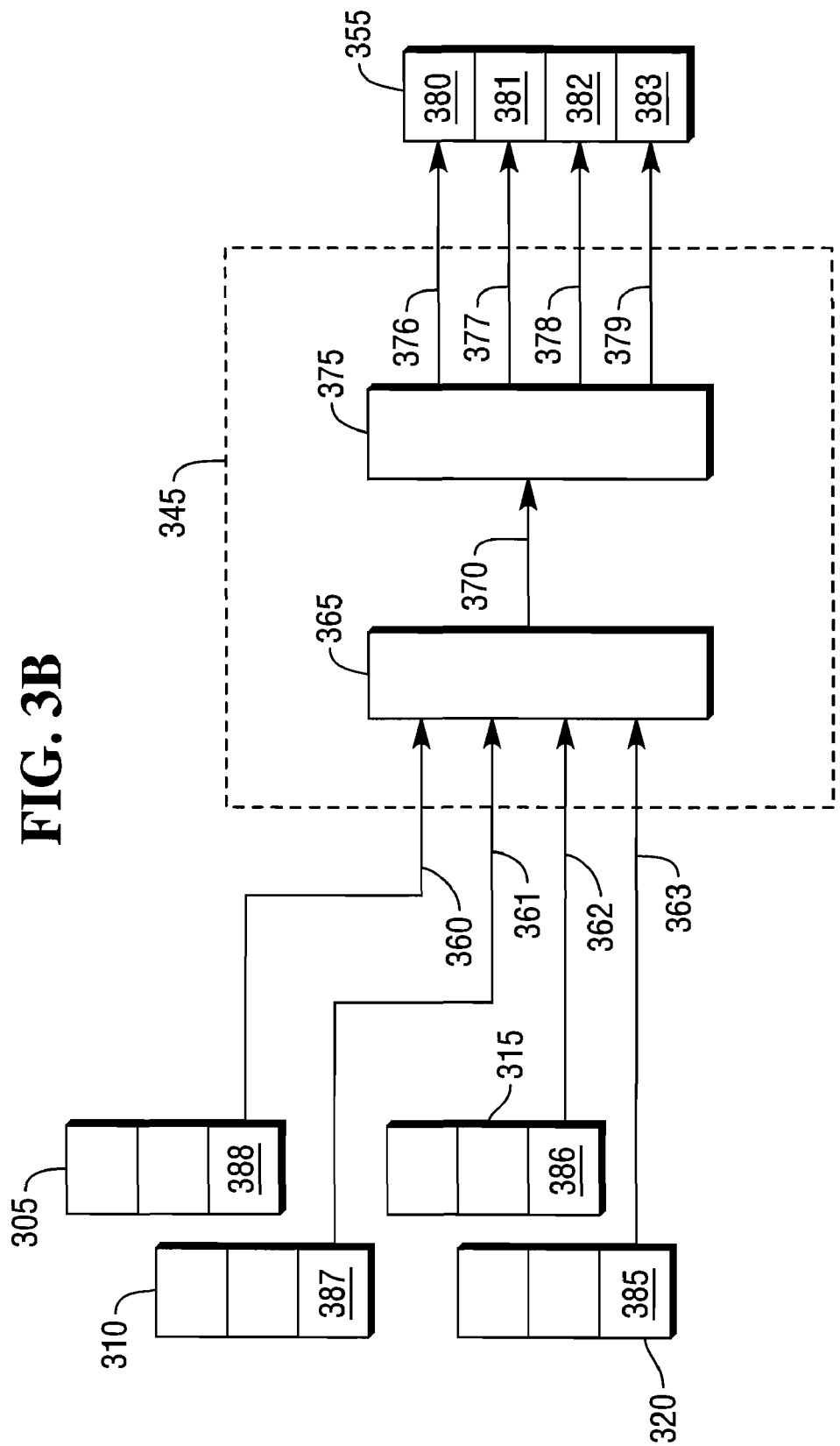

| | R4 | R3 | R2 | R1 |
|---|---|---|---|---|
| | 1 | 0 | 0 | 0 |
| | 0 | 1 | 0 | 0 |
| | 0 | 0 | 1 | 0 |
| | 0 | 0 | 0 | 1 |

FIG. 6B (37°)

| | R4 | R3 | R2 | R1 |
|---|---|---|---|---|
| | 1 | 0 | 0 | 0 |
| | 0 | 1 | 0 | 0 |
| | 0 | 1 | 0 | 0 |
| | 0 | 0 | 1 | 0 |

FIG. 6C (26°)

| | R4 | R3 | R2 | R1 |
|---|---|---|---|---|
| | 0 | 1 | 0 | 0 |
| | 0 | 1 | 0 | 0 |
| | 0 | 0 | 1 | 0 |
| | 0 | 0 | 1 | 0 |

FIG. 6D (0°)

| | R4 | R3 | R2 | R1 |
|---|---|---|---|---|
| | 0 | 1 | 0 | 0 |
| | 0 | 1 | 0 | 0 |
| | 0 | 1 | 0 | 0 |
| | 0 | 1 | 0 | 0 |

FIG. 6E (−26°)

| | R4 | R3 | R2 | R1 |
|---|---|---|---|---|
| | 0 | 0 | 1 | 0 |
| | 0 | 0 | 1 | 0 |
| | 0 | 1 | 0 | 0 |
| | 0 | 1 | 0 | 0 |

FIG. 6F (−37°)

| | R4 | R3 | R2 | R1 |
|---|---|---|---|---|
| | 0 | 0 | 0 | 1 |
| | 0 | 0 | 1 | 0 |
| | 0 | 0 | 1 | 0 |
| | 0 | 1 | 0 | 0 |

FIG. 6G (−45°)

| | R4 | R3 | R2 | R1 |
|---|---|---|---|---|
| | 0 | 0 | 0 | 1 |
| | 0 | 0 | 1 | 0 |
| | 0 | 1 | 0 | 0 |
| | 1 | 0 | 0 | 0 | ium
APPARATUS, METHOD AND SYSTEM FOR ELONGATING PIXEL DATA

TECHNICAL FIELD

The invention described herein relates generally to improvements to optical code imaging scanners and image sensors. More particularly, the invention relates to improving the detection of an optical code by generating an elongated pixel.

BACKGROUND

Optical code scanners are used in a wide variety of applications that rely on information stored in optical codes. Industries such as retail, airline, self-service, automotive, parcel delivery, pharmaceutical, healthcare and others use optical codes to provide inventory control, customer identification, product identification, item tracking, security and many other functions. Bar codes are a type of optical code in wide use and a bar code scanner is a type of optical code scanner used to read bar codes. A typical bar code is comprised of a number of bars separated by spaces. Information is encoded in a bar code by varying the width of the bars and spaces. When a bar code is placed within the field of view of a bar code scanner, the scanner will detect, analyze and decode the bars and spaces comprising the bar code to retrieve the information encoded wherein. This operation is also called scanning or reading a bar code. The information encoded on a bar code is usually a sequence of numeric or alphanumeric symbols (e.g., a Universal Product Code (UPC) or European Article Number (EAN)).

An imaging bar code scanner (also referred to as an image scanner) reads a bar code by capturing a digital image of the bar code and then processing the image to detect and decode the bar code. It is advantageous for the bar code scanner to successfully read all bar codes presented to the scanner on the first pass of each bar code by the scanner. This is known as a successful first pass read. Successful first pass reads of bar codes helps to maintain a good workflow at the checkout station and speeds up the overall checkout process. A high success rate for first pass reads has also been found to reduce stress on the person operating the scanner. This is particularly true if the operator is a customer operating a self-checkout terminal.

High performance passby barcode scanners based upon image capture and image processing technology have been slow to be adopted in passby scanning environments. In a retail environment, an image scanner must achieve high read success rates with object passby speeds of 30 to 50 inches per second. The image scanners on the market today have not proved capable of such speeds, which is one reason why laser based barcode scanners dominate the passby scanning environments.

One important barrier that has prevented image scanners from reaching high passby speeds is related to the detection of a bar code that is not aligned with the pixel rows of an image capture device used to capture an image of the bar code. A non-aligned or angled bar code is more difficult to detect because no single row of pixel data contains sufficient information to detect and decode the bar code. Therefore, multiple rows of pixel data must be read and analyzed before the bar code can be detected and decoded. In addition, lighting conditions may cause the captured image of the optical code to have a low contrast. The combined conditions of bar code non-alignment and low contrast make it very difficult to detect and decode a bar code.

Therefore, it would be desirable to provide an image capture device that over comes these and other problems.

BRIEF DESCRIPTION OF THE DRAWINGS

The invention, in accordance with preferred and exemplary embodiments, together with further objects and advantages thereof, is more particularly described in the following description taken in conjunction with the accompanying drawings in which like reference characters designate the same or similar parts throughout the several views and wherein:

FIG. 3B is a high level block diagram illustrative of an embodiment of the shift function of the shift and add command;

FIG. 4 is a representation of a portion of the image array of an image capture device;

FIGS. 6A-G are high level block diagrams illustrative of a captured bar code where each figure shows the bar code being presented at one of seven different angles.

DETAILED DESCRIPTION

In the following description, numerous details are set forth to provide an understanding of the claimed invention. However, it will be understood by those skilled in the art that the claimed invention may be practiced without these details and that numerous variations or modifications from the described embodiments are possible.

Figure 1:
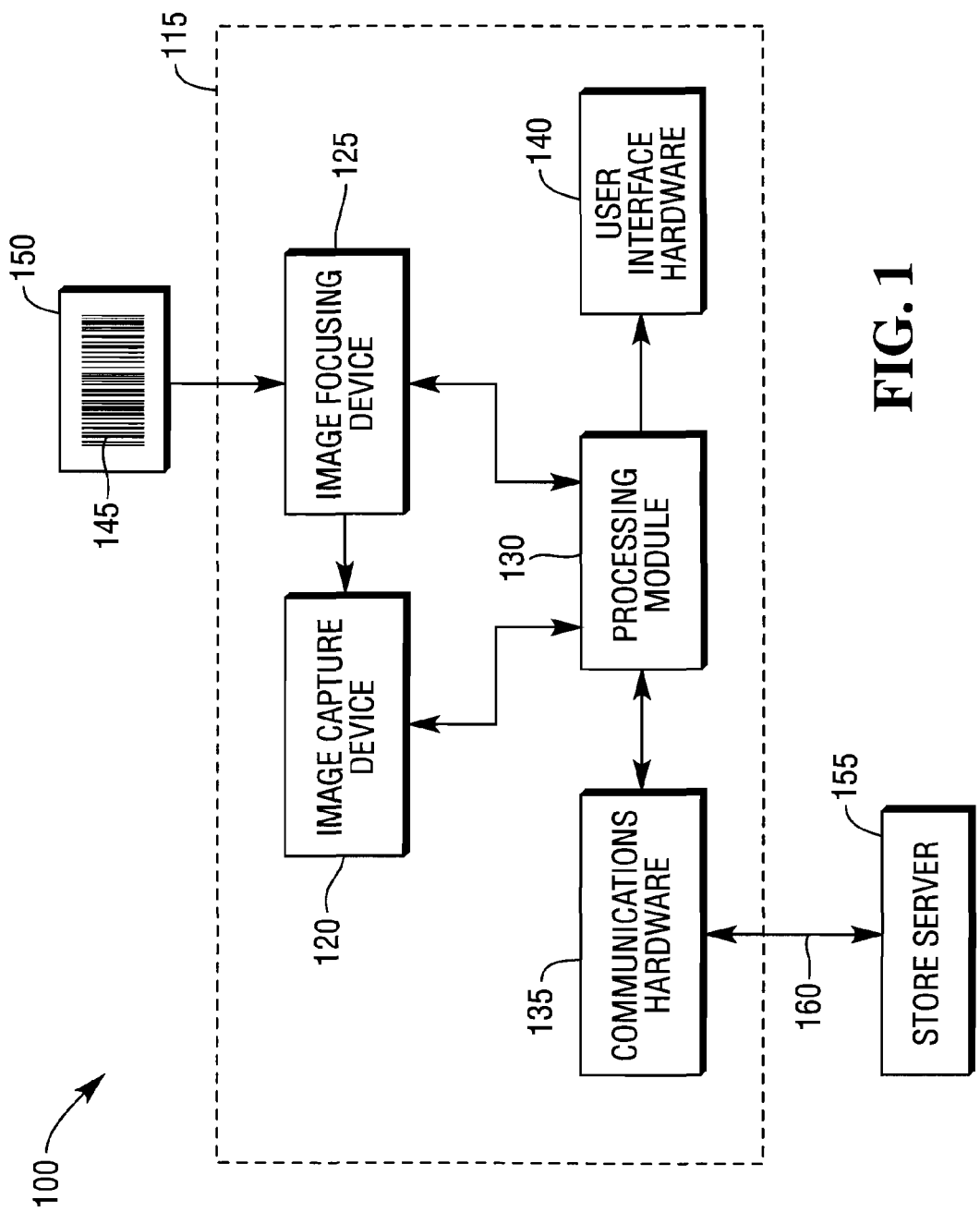
FIG. 1 is a high level block diagram illustrative of an embodiment of an image scanning system.

With reference to FIG. 1, there is provided a high level illustration, in block form, of an embodiment of an image scanning system 100, which is used to scan a bar code 145. The image scanning system 100 comprises an image scanner 115, a store server 155 and a bar code 145 printed on a label 150. The image scanner 115 communicates with the store server 155 over a computer data network 160. The network 160 can be a wired network (e.g., an Ethernet network) or wireless network (e.g., an IEEE 802.11G based network) or a combination of both. In some embodiments, the store server 155 is physically removed from the store where the image scanner 115 is located and communicates with the image scanner 115 over the Internet or a wide area network or a combination of these or different types of networks. In some embodiments, multiple image scanners 115 communicate over the data network 160 to the store server 155.

The image scanner 115 includes an image-focusing device 125 that receives an image and focuses the image onto an image capture device 120. The image scanner 115 is further comprised of a processing module 130, user interface hardware 140, and communications hardware 135. The processing module 130 comprises at least one processor, memory, stored instructions and control and interface hardware to control the other devices and modules of the image scanner 115. The processing module 130, by executing the stored instructions, controls the hardware devices and modules that comprise the image scanner 115 or are connected to the image scanner 115. In addition, the stored instructions cause the processor to: process data such as an image that is captured by the image capture device 120, control the communications hardware 135 to implement protocols used on the data network 160 and implement other software features and functions of the image scanner 115. In some embodiments, the store server 155 sends the image scanner 115 updates to the stored instructions or to the operating parameters of the image scanner 115. These updated stored instructions are stored in the image scanner 115 and then executed as required.

Image capture device 120 converts light reflected from bar code 145 into electrical signals. The source of the reflected light may be ambient light or light from an illumination device if sufficient ambient light is unavailable. The image capture device 120 is a silicon-based device with both optical and integrated circuits and may be fabricated as a complimentary metal oxide semiconductor (CMOS) integrated circuit. Image capture device 120 may include a charge coupled device (CCD) or a CMOS device.

Image capture device 120 captures an optical image, focused on its surface, by converting the optical image to an electronic digital image comprised of pixel information or data organized into rows and columns. (As used in this application, the term "pixel," "pixels" or "pixel data" refers to the information or data captured by the image capture device 120 and associated with one or more pixels.) The time required to read all of the raw pixel data from the image capture device 120 is relatively long compared to the time required to simply capture the digital image in the image capture device 120.

Figure 2:
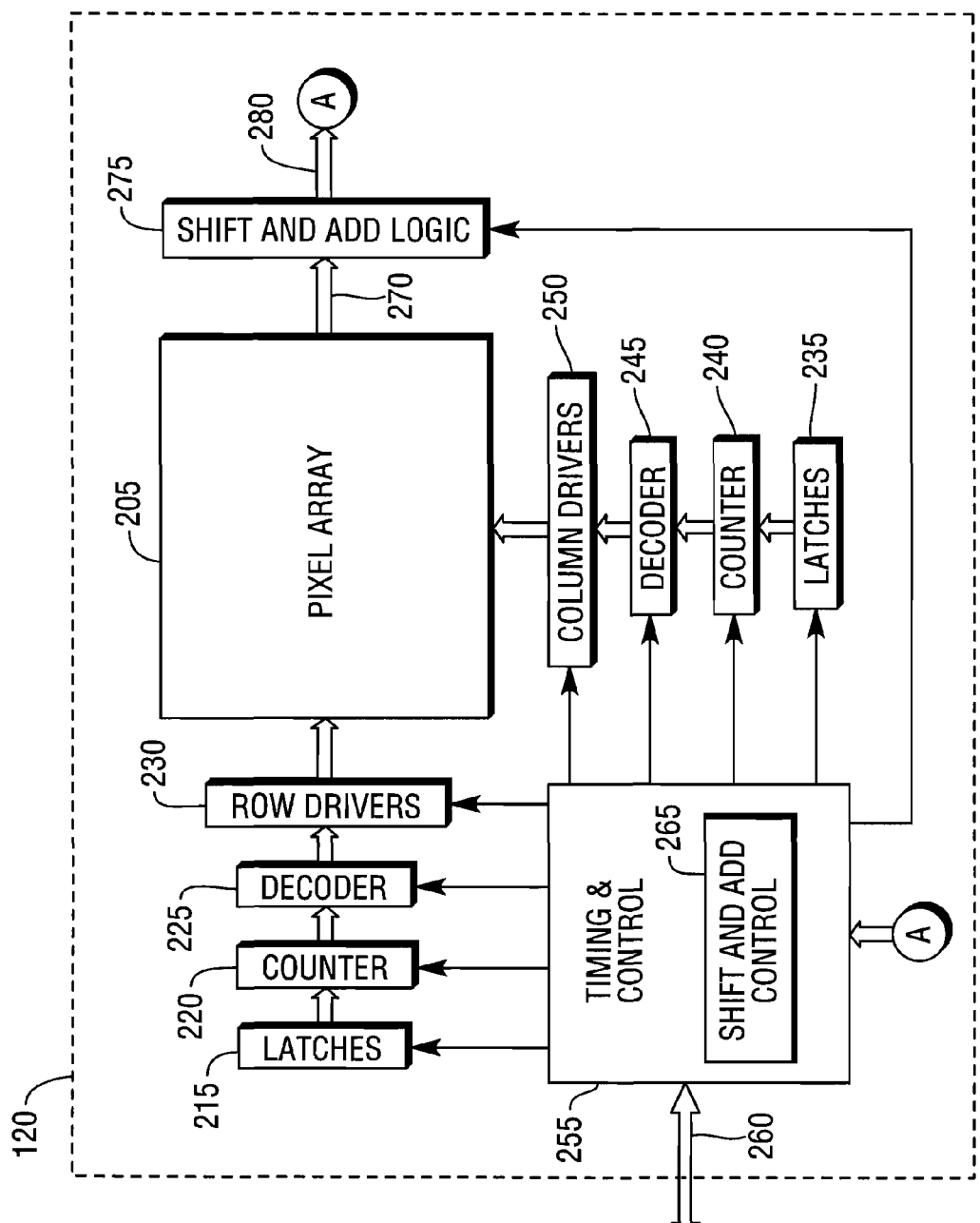
FIG. 2 is a high level block diagram illustrative of an embodiment of an image capture device.

Turning to FIG. 2, there is provided a high level block diagram of an image capture device 120. In this embodiment, the image capture device 120 is implemented as a CMOS device. The pixel array 205 defines the optically active area of the image capture device 120 and is where light or photon energy is converted into electric energy and stored as individual pixel data. An individual pixel contains data wherein the magnitude of the data is proportional to the total amount of photon energy striking a given area of the pixel array 205 integrated over a period of time. The pixels are physically organized into rows and columns. Timing and control logic 255 controls the operations of the image capture device 120 including capturing an image and reading pixel data from the pixel array 205 that represent the captured image. External interface 260 provides access to and control of the timing and control logic 255 to external devices (i.e., a processor 130 or specialized hardware designed or programmed to process data from the image capture device 120). The external interface 260 is also used to receive commands from external devices and to send and receive data, including pixel data. Pixel data, captured by the image capture device 120, is transferred from the pixel array 205 through an interface 270 to the shift and add logic 275. The timing and control logic 255 is responsible for the movement of data and controlling the transfer of data from the shift and add logic 275 externally through the external interface 260 when an external device signals it is ready to receive the data.

The timing and control logic 255 contains shift and add control logic 265 to implement a shift and add command. The shift and add control logic 265 controls the shift and add logic 275 which manipulates pixel data from the pixel array 205. The timing and control logic 255, using the shift and add control logic 265, controls the operation of the shift and add logic 275 and the movement of pixel data from the pixel array 205 to the shift and add logic 275. The timing and control logic 255 also controls the movement of pixel data generated by the shift and add logic 275 through an internal interface 280 and to the external interface 260 when an external device is ready to read the data.

The external interface 260 connects the image capture device 120 to an external data/control bus (not shown). The timing and control logic 255 manages the data/control bus and communications with one or more external devices. In addition, the timing and control logic 255 receives commands and parameters used to control the operation of the image capture device 120. Some commands are low-level bus commands that control the operation of a bus. Other high-level commands control the operations of the image capture device.

An example of a high-level command to the image capture device 120 is a command to "read-out all pixel data" from the pixel array 205. In this example, the shift and add function is turned off and the shift and add logic 275 acts as a pixel buffer without modifying any of the pixel data as it passes through. This is an atomic command and causes the timing and control logic 255 to read all pixel data from the pixel array 205 and deliver the data to an external device in one continuous operation. The timing and control logic 255 starts the process by loading the row latches 215 with the first row number of the pixel array 205 and the column latches 235 with the first column number of the pixel array 205. The row latches 215 drive a row counter 220 which increments the row number on command from the timing and control logic 255 to allow each row of the pixel array to be selected in its turn or as needed. The output of the row counter 220 drives a row decoder 225, which generates a select row signal corresponding to a single row in the pixel array 205. The output of the row decoder 225 connects to the row drivers 230, which buffers and transmits a row select signal to the pixel array 205 to select a single row of pixel data. The column latches 235 drive a column counter 240, which will increment the column number on command from the timing and control logic 255 to allow each column in a row to be selected in its turn or as needed. The output of the column counter 240 drives a column decoder 245, which generates a single column select signal corresponding to a single column in the pixel array 205. The output of the column decoder 245 connects to the column drivers 250, which buffers and transmits a column select signal to the pixel array 205. The row and column select signals combine to select a single pixel from the pixel array 205. The pixel data for the selected pixel is moved to the shift and add logic 275 where it is stored before being read by a processor module 130 or computer logic that is external to the image capture device 120. The timing and control logic 255 continues to read every pixel in the pixel array 205 and transfer the data to an external device.

External devices read pixel data from the image capture device 120 by issuing low-level bus commands to the external interface 260. The timing and control logic 255 then moves pixel data from the shift and add logic 275 to the external interface 260 to satisfy the request for data. An individual low-level bus read command should not be equated to a high level atomic command to read multiple pixels from the image capture device 120. A low-level bus read command can only read data that is made available as a result of a high-level atomic command to read pixel data from the image capture device 120.

The shift and add logic 275 buffers a plurality of pixel data so that multiple pixels can be read with a single external bus access to the image capture device 120. This reduces the bus overhead needed to read the pixel array 205 because fewer bus read commands are required to read the pixel array 205. In some embodiments, the shift and add logic 275 conditions or transforms the pixel data from an analog form to a digital form.

The timing and control logic 255 implements a "shift and add" command using the shift and add control logic 265. The shift and add command causes multiple rows of pixel data to be selected and read from the pixel array 205. The pixel data in the selected rows of pixels are then shifted to the left or right by one or more pixel positions as determined by parameter settings in the shift and add command. (Note: the parameter settings can cause a row to be shifted by zero pixel positions which means no pixel data is shifted for that row.) A standard register shift operation is performed on the row of pixels where pixel data shifted out of a row is lost and a value representing zero light is shifting into a row. The number of columns each pixel is shifted can be different for each pixel row. The resulting pixel data from each of the selected rows of pixels are added together, by column, to generate a single row of modified pixel data. The row of modified pixel data is then read from the image capture device 120. In some embodiments, the shift operation is accomplished by incrementing the contents in a hardware pointer.

As described in more detail below, the parameter settings associated with the shift and add command determine which rows of pixels are selected and by how many pixel columns the pixels of each selected row are shifted. Changing the number of pixel columns each pixel row is shifted will generate a different result for the row of modified pixel data. When a portion of an image of the bar code 145 is capture by the selected rows of pixels, certain of the parameter settings will cause a generated row of modified pixel data to have an increased contrast ratio when compared to any single row of the selected rows of pixels. Thus, making the bar code 145 easier to detect and decode. However, certain other parameter settings will cause a generated row of modified pixel data to have a decreased contrast ratio when compared to any single row of the selected rows of pixels. Thus, making the bar code 145 more difficult or impossible to detect and decode. Whether a specify parameter setting will cause an increase or decrease in the contrast ratio depends on the alignment of the bar code 145 to the image capture device 120. Since this alignment is unknown prior to detecting the presences of the bar code 145, multiple rows of modified pixel data are generated using different parameter settings. Each parameter setting is optimized for a bar code 145 presented to the image capture device 120 at a specific angle. Thus, one of the possible settings should approximate the actual angle of the bar code 145 and result in an increased contrast ratio making it easier to detect and decode the bar code 145. In some embodiments, the shift and add command will cause the timing and control logic 255 to automatically generate as many as seven different rows of modified pixel data from the original selected rows where each modified row is optimized for a different bar code 145 angle.

In some embodiments, the shift and add command will specify a row in the pixel array 205 and cause a modified row of pixel data to be generated using the specified row and adjacent rows. In other embodiments, the shift and add command turns on or off a mode of reading rows of pixels. When the shift and add mode is turned on, any command that reads a row of pixel data will result in the reading a modified row of pixel data instead of a row of raw pixel data as requested. The modified row of pixel data is generated by the timing and control logic 255 using parameters settings from the shift and add command to select a number of rows of pixels from the pixel array 205 and perform the proper shifting and adding. The selected rows of pixels used by the shift and add function will include the row that the read command requested to read. In some embodiments, a request to read a single row of pixel data will cause the image capture device to return multiple rows of modified pixel data, each row optimized to a different presentation angle of the bar code 145. The number of rows returned for each read operation is determined by the parameter settings of the shift and add command.

Figure 3A:
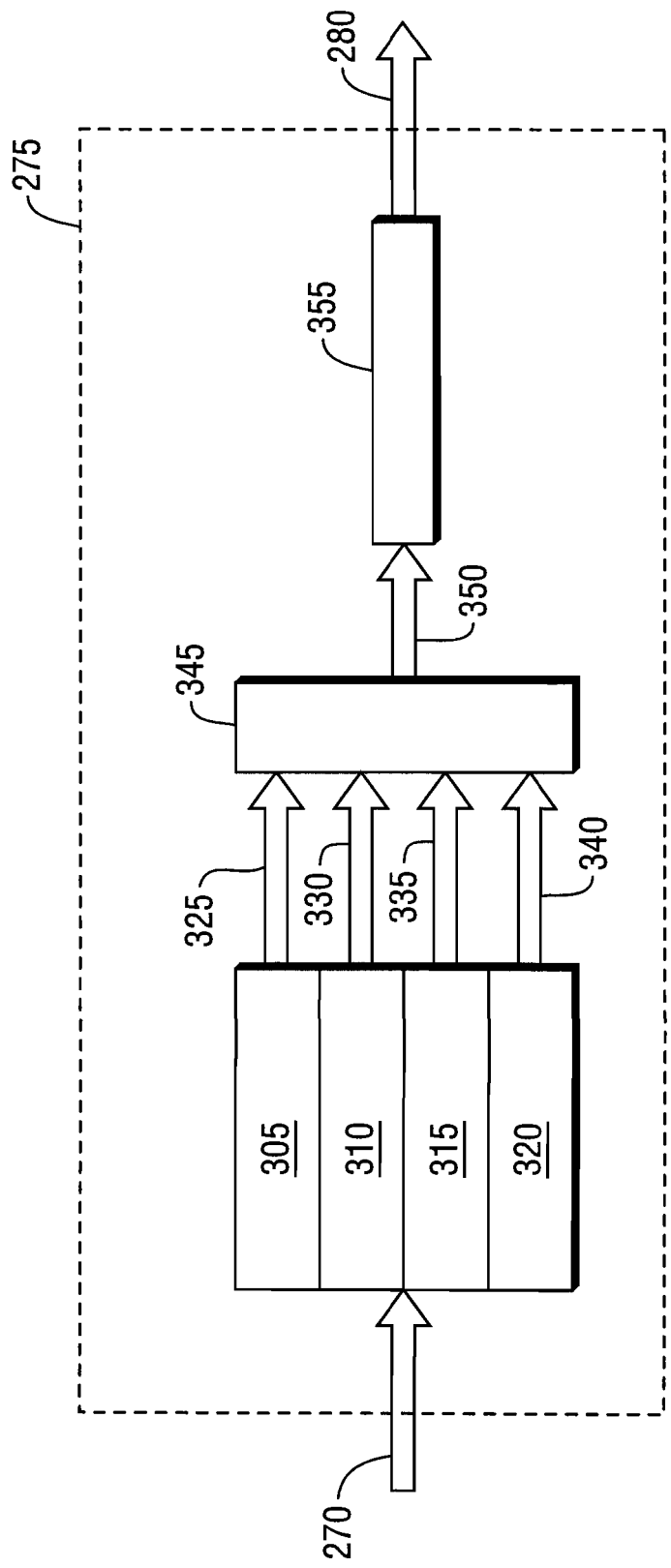
FIG. 3A is a high level block diagram illustrative of an embodiment of logic to implement a shift and add command.

Turning now to FIG. 3A. This figure depicts a high level block diagram of the shift and add logic 275. The shift and add logic 275 is controlled by the timing and control logic 255 which implements a shift and add command. After a shift and add command is decoded by the timing and control logic 255, four rows of pixel data are selected and read from the pixel array 205. The selected rows of pixel data are moved using bus 270 and stored in four temporary registers 305, 310, 315, 320. An accumulator register 355 is reset which sets all values in the register to a value that represents no light or a dark pixel. The timing and control logic 255, using the parameter settings of the shift and add command, determines how many pixel columns and in what direction to shift the pixel data in the first temporary register 305. A multiplexer and shift device 345 is then directed to move the pixel data from the first temporary register 305 using a bus 325 and then to shift the pixels data as determined by the parameter settings. The output of the shift operation is then moved over a bus 350 to the accumulator register 355. The accumulator register 355 performs a column by column add operation of the pixel data received on the bus 350 to the value stored in each corresponding column of the accumulator register 355 with the results becoming the new value stored in the corresponding column of the accumulator register 355. For each of the other temporary registers 310, 315, 320 the same operation is performed. The timing and control logic 255 determines how many pixel columns and in what direction to shift the pixel data and directs the multiplexer and shift device 345 to perform the proper operations. Finally, the timing and control logic 255 causes the accumulator register 355 to add the output of the shift operation to the current values of the accumulator register 355 using a column by column add function.

After the pixel data from all the temporary registers 305, 310, 315, 320 has been processed, the pixel data generated in the accumulator register 355, referred to as a modified row of pixel data, is transferred externally to the image capture device 120 for further processing. The modified row of pixel data is moved from the accumulator register 355 to the timing and control logic 255 using bus 280 and then externally using bus 260. Each different parameter settings will normally cause the generation of a unique modified row of pixel data optimized for a given bar code 145 presentation angle. Certain patterns of pixel data, such as all pixel data having the same value, will cause different parameter settings to generate the same modified row of pixel data. In normal operation, this condition is rare.

It should be noted that in processing the selected rows of pixels, not all rows of pixels are required to be shifted. In some embodiments, one of the possible parameter setting results in none of the selected rows of pixels having any pixels shifted. This setting represents the bar code 145 being presented at a 0-degree angle to the image capture device 120 which means the bars of the bar code 145 are perpendicular to the captured rows of pixel data (pixel data for a bar is captured already aligned in the same column).

Turning now to FIG. 3B. This figure depicts additional information on how the multiplexer and shift device 345 operates, in one embodiment. Three pixel columns of each of the four temporary registers 305, 310, 315, 320 are shown along with a portion of a multiplexer device 365 and a shift device 375. Pixel column one 388 of the first temporary register 305 is connected to the multiplexer device 365 by path 360. Likewise, the first pixel columns 387, 386, 385 of each of the other temporary registers 310, 315, 320 are connected to the multiplexer device 365 by three additional paths 361, 362, 363. The timing and control logic 255 directs the multiplexer device 365 to allow pixel data from the first pixel column of any one of the temporary registers 305, 310, 315, 320 to flow through the multiplexer device 365 to the shift device 375 using a path 370. The timing and control logic 255 also directs the shift device 375 to shift the pixel data applied on the path 370 to one of four output paths 376, 377, 378, 379 depending on how the pixel data is to be shifted. If no shifting is performed, the pixel data applied on path 370 is outputted on path 379 and sent to the first pixel column 383 of the accumulator register 355. If the shift device 375 is directed to shift the pixel data to the right by one pixel column, the pixel data applied on path 370 is outputted on path 378 and sent to second pixel column 382 of the accumulator register 355. If the shift device 375 is directed to shift the pixel data to the right by two pixel columns, the pixel data applied on path 370 is outputted on path 377 and sent to the third pixel column 381 of the accumulator register 355. Finally, if the shift device 375 is directed to shift the pixel data to the right by three pixel columns, the pixel data applied on path 370 is outputted on path 376 and sent to the fourth pixel column 380 of the accumulator register 355. This example demonstrates the operations performed on a single column of pixel data selected from the first temporary register 305. The multiplexer and shift device 345 performs the above operations in parallel on all columns of the pixel data selected from one of the temporary registers 305, 310, 315, 320.

When the pixel data, for all pixel columns, is applied to the accumulator register 355, the timing and control logic 255 will cause the accumulator register 355 to add the value of the applied pixel data to the current value of the accumulator register 355 for that pixel column. FIG. 3B depicts a portion of the devices required to multiplex and shift one column of pixel data from the temporary registers 305, 310, 315, 320 to the accumulator register 355. The depicted devices are replicated for the other pixel columns in the temporary registers 305, 310, 315, 320 and the accumulator register 355.

In the current embodiment, the pixel data is an analog form. All of the devices are designed to operate on the analog data of each pixel. However, in some embodiments, the analog data of each pixel is converted to digital data prior to the pixel data being stored in the temporary register. In these embodiments, the devices are designed to operate on digital pixel data. In some embodiments, the analog pixel data is converted to digital pixel data after the pixel data is transferred from the accumulator register 355.

Figure 4:
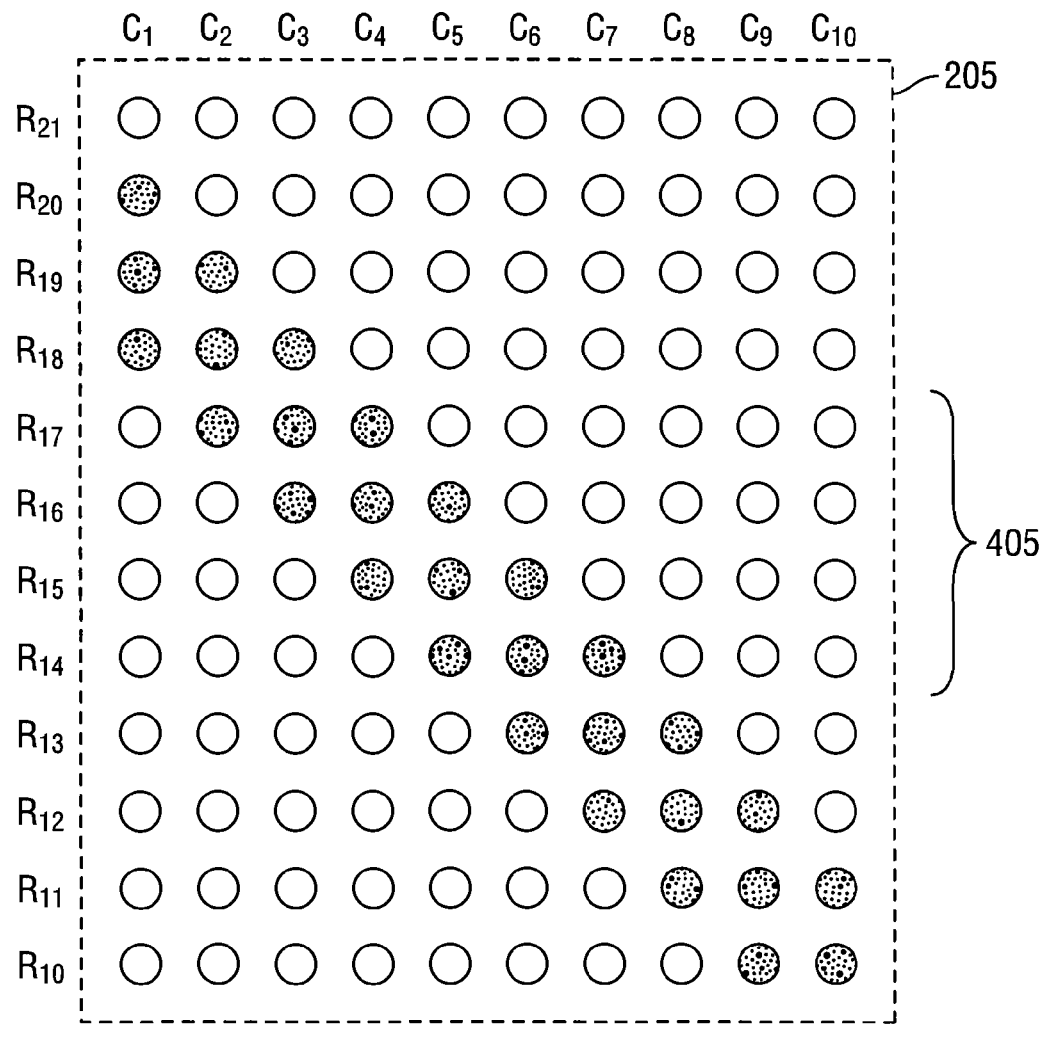

Turning now to FIG. 4, which is a simplified visual depiction of a portion of a bar code image stored in a portion of the pixel array 205. Shown are columns one through ten ($C_1$-$C_{10}$) of rows ten through twenty-one ($R_{10}$-$R_{21}$). The optical code was presented at a 45-degree angle (descending from upper left to lower right) to the image capture device 120. The shading of the circles represents light values for individual pixels of the image capture device 120 identified by row and column number. The light filled circles represent reflected light or a white area of the bar code and the dark filled circles represent no reflected light or a black area of the bar code. Rows fourteen through seventeen 405 have been selected for processing by a shift and add command.

Figure 5A:
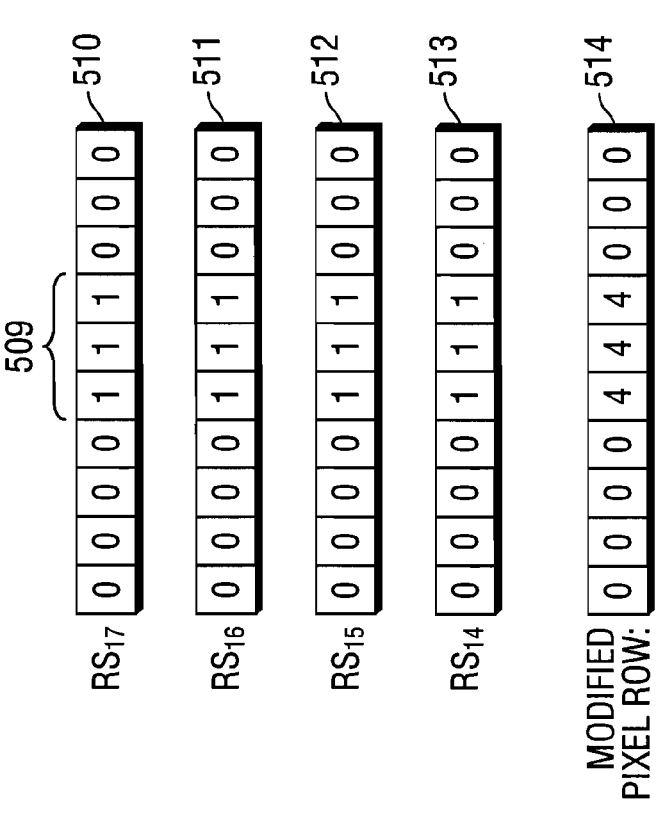
FIG. 5A is a high level block diagram illustrative of an embodiment a shift and add command showing un-shifted image data in numeric form.

FIG. 5A depicts pixel rows $R_{14}$ through $R_{17}$ 508, 507, 506, 505 using numerical data to represent the bar code image visually depicted in FIG. 4. The number zero has been used to represent a pixel value for a white color and the number one has been used to represent a pixel value for a black color. In this example, there is a high contrast ratio between the pixels that represent a white and a black area of the image. As a result, processing any of the four selected rows individually to detect the optical code is relatively easy and straightforward. The difference between a white and black area using the assigned values is always one. It should be pointed out that in real-life applications the contrast ratio between white and black areas can be much smaller making is difficult to detect the presences of an optical code.

Figure 5B:
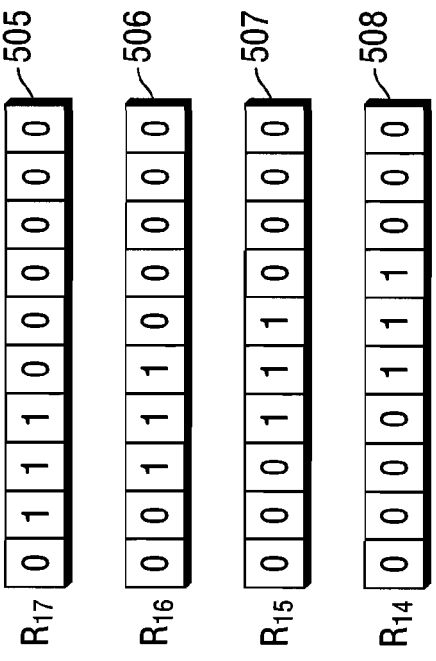
FIG. 5B is a high level block diagram illustrative of an embodiment the shift and add command showing the shifted image data after a shift representing a 45° bar code angle is perform.

Turning to FIG. 5B, the pixel data from FIG. 5A is shown in pixel rows $RS_{14}$ through $RS_{17}$ where the shift operation of a shift and add command has been performed. The parameter settings for the shift and add command are optimized for an bar code presented at a 45-degree angle to the image capture device 120. In this example, the pixel data in pixel row $RS_{14}$ 513 is not shifted. The pixel data for this row is the same as shown in $R_{14}$ 508 of FIG. 5A. The pixel data in pixel row $RS_{15}$ 512 has been shifted one pixel column to the right from their position shown in row $R_{15}$ 507 of FIG. 5A. The pixel data in pixel row $RS_{16}$ 511 has been shifted two pixel columns to the right from their position shown in row $R_{16}$ 506 of FIG. 5A. Finally, the pixel data in pixel row $RS_{17}$ 510 has been shifted three pixel columns to the right from their position shown in row $R_{17}$ 505 of FIG. 5A. Because the parameter settings of the shift and add command are optimized for an bar code presented at 45-degrees and the bar code was presented at 45-degrees, all of the pixel data in each of the four rows having a value of one are now aligned in the same columns. Three of the ten pixel columns 509 after the shift operation have all ones. The remaining columns now have all zeros. The add operation of the shift and add command adds the pixel data of each of the four pixels rows together, by column, to generate a modified pixel row 514. In the modified pixel row 514, the white areas are still represented with a value of zero but the black areas are now represented with a value of four. The contrast ratio between the white and black areas of the image has now increased from a value of one to a value of four. This is four times better than it was prior to processing the original pixel data with a shift and add command. Each pixel in the modified pixel row 514 is known as an elongated pixel because the shift and add command formed a physical equivalent of a slender 1 column wide by 4 row high pixel, that could fit into the narrow bars of a barcode, by processing four other pixels taken from four different rows of pixels.

FIGS. 6A-6G depict seven partial images of a bar code 145 presented to the image capture device 120 at seven different angles. The angle is listed in each figure. An angle of zero means the bars of the bar code 145 are presented perpendicular to the rows of pixel data in the pixel array 205. Each of the figures depicts pixel data organized into a four row by four column pixel array. Pixel data having a value of one represents a black area of the image and pixel data having a value of zero represents a white area of the image. To provide a better visual representation of a bar in the bar code 145, the image data has been simplified so that each row has only one column of pixel data that is set to a one. The pixel data in the figures have not been modified by a shift and add command. The object of each figure is to show how the pixel data for an optical code would look for a given angle and to determine how many pixel columns the pixel data of each pixel row must be shifted to align all the pixel data having a value of one into the same column. The shift and add command has parameter settings for these seven angles which when implemented by the timing and control logic 255 will cause each pixel row to be shifted the proper number of pixel columns (in some cases the number of pixels columns to shift a given row is zero) so that the pixels representing the black area or bar are moved to the same pixel column for each pixel row. Once the shift operation is complete, the add operation adds all the pixel data in each column together to generate a row of modified pixel data.

Referring to FIG. 6A, which represents a bar code presented at a 45-degree angle to the image capture device 120 with a black area or bar extending from the upper left to the lower right of the pixel array. To align the one values of each pixel row in the same column, the following shifts are performed: 1) the pixel data in row $R_2$ is shifted to the right by one pixel column, 2) the pixel data in row $R_3$ is shifted to the right by two pixel columns, and 3) the pixel data in row $R_4$ is shifted to the right by three pixel columns. No shift of pixel data is performed on row $R_1$ or put another way, the pixel data of row $R_1$ is shifted by zero pixel columns. The shift operations described here are performed by the shift and add command when the parameter settings of the command specify this angle.

It should be noted that to minimize logic needed to implement a shift and add command, a shift operation is performed on every selected pixel row. However, if the number of pixel columns to shift a pixel row is set to zero, no actual shift of pixel data will occur. The parameter settings of the shift and add command will determine how many pixel columns each pixel row must be shifted.

Referring to FIG. 6B, which represents a bar code presented at a 37-degree angle to the image capture device 120 with a black area or bar extending from the upper left to the lower right of the pixel array. To align the one values of each pixel row in the same column, the following shifts are performed: 1) the pixel data in row $R_2$ is shifted to the right by one pixel column, 2) the pixel data in row $R_3$ is shifted to the right by one pixel column, and 3) the pixel data in row $R_4$ is shifted to the right by two pixel columns. No shift of pixel data is performed on row $R_1$ or put another way, the pixel data of row $R_1$ is shifted by zero pixel columns. The shift operations described here are performed by the shift and add command when the parameter settings of the command specify this angle.

Referring to FIG. 6C, which represents a bar code presented at a 26-degree angle to the image capture device 120 with a black area or bar extending from the upper left to the lower right of the pixel array. To align the one values of each pixel row in the same column, the following shifts are performed: 1) the pixel data in row $R_3$ is shifted to the right by one pixel column, and 2) the pixel data in row $R_4$ is shifted to the right by one pixel column. No shift of pixel data is performed on rows $R_1$ and $R_2$ or put another way, the pixel data in these rows are shifted by zero pixel columns. The shift operations described here are performed by the shift and add command when the parameter settings of the command specify this angle.

Referring to FIG. 6D, which represents a bar code presented at a 0-degree angle to the image capture device 120 with a black area or bar extending vertically from the top to the bottom of the pixel array. Since the one values of each pixel row are already aligned in the same column, no shifting is required or all selected pixel rows are shifted by zero pixel columns. The shift operations described here are performed by the shift and add command when the parameter settings of the command specify this angle.

Referring to FIG. 6E, which represents a bar code presented at a −26-degree angle to the image capture device 120 with a black area or bar extending from the lower left to the upper right of the pixel array. To align the one values of each pixel row in the same column, the following shifts are performed: 1) the pixel data in row $R_1$ is shifted to the right by one pixel column, and 2) the pixel data in row $R_2$ is shifted to the right by one pixel column. No shift of pixel data is performed on rows $R_3$ and $R_4$ or put another way, the pixel data in these rows are shifted by zero pixel columns. The shift operations described here are performed by the shift and add command when the parameter settings of the command specify this angle.

Referring to FIG. 6F, which represents a bar code presented at a −37-degree angle to the image capture device 120 with a black area or bar extending from the lower left to the upper right of the pixel array. To align the one values of each pixel row in the same column, the following shifts are performed: 1) the pixel data in row $R_1$ is shifted to the right by two pixel columns, 2) the pixel data in row $R_2$ is shifted to the right by one pixel column, and 3) the pixel data in row $R_3$ is shifted to the right by one pixel column. No shift of pixel data is performed on row $R_4$ or put another way, the pixel data of row $R_4$ is shifted by zero pixel columns. The shift operations described here are performed by the shift and add command when the parameter settings of the command specify this angle.

Referring to FIG. 6G, which represents a bar code presented at a −45-degree angle to the image capture device 120 with a black area or bar extending from the lower left to the upper right of the pixel array. To align the one values of each pixel row in the same column, the following shifts are performed: 1) the pixel data in row $R_1$ is shifted to the right by three pixel columns, 2) the pixel data in row $R_2$ is shifted to the right by two pixel columns, and 3) the pixel data in row $R_3$ is shifted to the right by one pixel column. No shift of pixel data is performed on row $R_4$ or put another way, the pixel data of row $R_4$ is shifted by zero pixel columns. The shift operations described here are performed by the shift and add command when the parameter settings of the command specify this angle.

A bar code 145 is not always presented to the image capture device 120 at exactly one of these precise angles. However, it should be noted that when a bar code 145 is presented within as much as plus or minus 15-degrees of one of the above defined angles, the shift and add command, with parameter settings set to the nearest defined angle, will still properly align the pixel data to increase the contrast ratio. Therefore, these seven defined angles are sufficient to properly align a bar code 145 presented to the image scanner 120 at any angle because at least one of the seven defined angles will result in the proper alignment of the pixel data and thus generate pixel data with an increased contrast ratio for the bar code 145.

In some embodiment, the parameter settings of the shift and add command will specify one of the defined seven angles and the shift and add function will return a single modified row of pixel data where the pixel data was shifted based on the specified angle. In other embodiments, the shift and add command will return multiple different rows of modified pixel data where the shift and add command uses parameter settings that specify different angles are to used to generated each of the returned rows. That would mean up to seven modified pixel rows (one row for each of the angles defined in FIGS. 6A-6G) could be returned for each row of pixel data read from the image capture device 120. In some embodiments, the parameter settings of the shift and add command determine how many modified pixel rows are returned. If the number of returned rows is set to seven, then a modified pixel row is generated for each of the seven defined angles and returned. If the number of returned rows is set to three, then only three modified pixels rows are generated and returned using three of the seven defined angles. The angles used to generate the modified pixel rows are predefined for the shift and add command for a given embodiment. For example, if the parameter settings specify that three modified pixel rows are to be returned, the three angles used to generate them would be predefined to always be same angles, e.g., 45°, 0°, and −45°. The predefined angles could be different for different embodiments.

In some embodiments, the shift and add command is used to turn-on a shift and add mode of operation. In these embodiments, the shift and add command does not instantly cause modified pixel data to be generated and returned. Instead, the shift and add command turns on the shift and add mode of operation and stores parameter settings that determine how future shift and add operations will be performed. The actual shift and add operation is not performed until a command is received that causes a row of pixel data to be read from the pixel array 205. At that time, the timing and control logic 255 will implement a shift and add operation selecting four rows of pixel data from the pixel array 205 where one of the selected rows is the row of pixels being requested by the read command. The other three rows of pixel data are adjacent to the requested pixel row. The timing and control logic 255 will use the stored parameter settings to perform the shift and add operation. As described above, the parameter settings determine that one or more modified pixel rows will be generated and returned. This type of operation will continue every time a row of pixel data is requested to be read until the shift and add mode is turned off.

In this embodiment, the shift and add command always selects four rows of pixel data and then performs the shift and add operations on the selected rows of pixel data. Other embodiments select more or less than four rows of pixel data and then perform the shift and add operations on the selected rows of pixel data. The shift operation is modified based on the number of selected pixel rows but the results of the shift still cause the bar data to be aligned in a single column.

Figure 7:
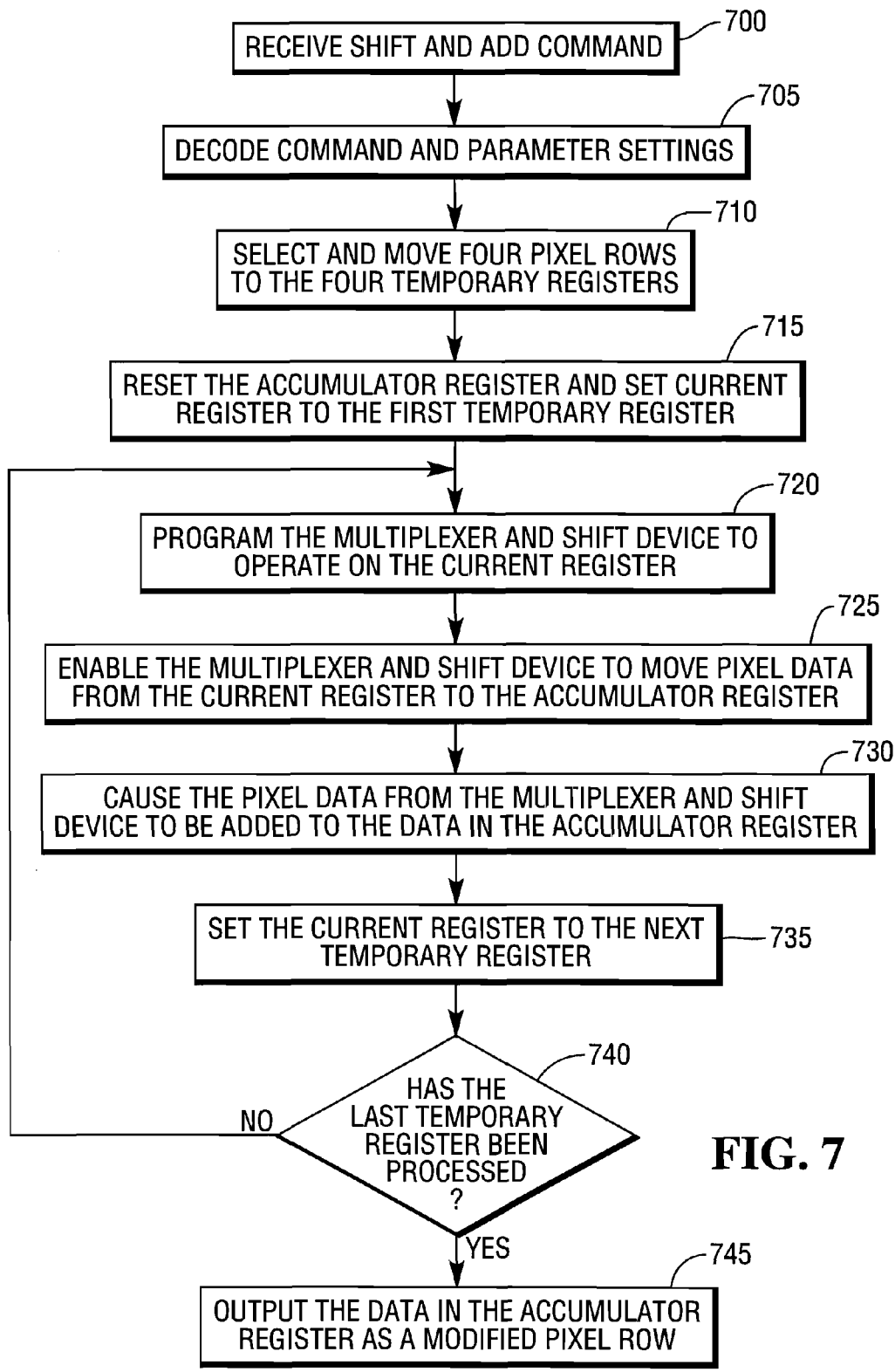
FIG. 7 is a flow diagram of an embodiment of the shift and add command.

Turning to FIG. 7, there is provided a high level flow diagram illustrating the steps used by the timing and control logic 255 to execute a shift and add command. In this illustration, the shift and add command causes the generation of a modified pixel row without requiring a separate read command. In addition, the timing and control logic 255 includes the shift and add control logic 265, thus a reference to the timing and control logic 255 includes a reference to the shift and add control logic 265.

The timing and control logic 255 receives a shift and add command (step 700) and decodes the command and parameter settings that are part of the command (705). The timing and control logic 255, using the parameter settings, selects four rows of pixel data from the pixel array 205 and moves them to four temporary registers 305, 310, 315, 320 (Step 710). The parameter settings specify one row of pixel data in the pixel array 205, which is selected along with three other adjacent rows of pixels. The four temporary registers 305, 310, 315, 320 each have sufficient storage capacity to store all the pixel data from one row of pixel data. An accumulator register is reset (step 715) causing the contents to be set to zero. The accumulator register also has sufficient storage capacity to store all the pixel data from one row of pixel data. The timing and control logic 255 maintains a pointer variable called the "current register" that is used to identify which of the temporary registers 305, 310, 315, 320 is currently being operated on. The current register is set to the first temporary register (step 715). A multiplexer and shift device 345 is used to select the pixel data from one of the temporary registers 305, 310, 315, 320, shift, if necessary, each pixel one or more pixel columns and present the shifted pixel data to an accumulator register 355. The timing and control logic 255, using information from the parameter settings, programs the multiplexer and shift device 345 to select the temporary register pointed to by the current register and to perform the desired shift of pixel data for the row of pixel data stored in the temporary register (step 720). Once programmed, the multiplexer and shift device 345 is enabled causing it to select the proper pixel data, perform the desired shift of the pixel data (shifting pixel data by zero pixel columns is still considered a shift) and present the shifted pixel data to the accumulator register 355 (step 725). The timing and control logic 255 causes the accumulator register 355 to add the shifted pixel data from the multiplexer and shift device 345 to the current contents of the accumulator register 355 (step 730). The addition occurs by pixel column. The current register is set to point to the next temporary register (step 735). If all temporary registers have been processed, the current register is set to null or a similar type of value. If not all temporary registers have been processed, control is passed to step 720 to continue processing (step 740). If all temporary registers 305, 310, 315, 320 have been processed, the pixel data in the accumulator register 355 is outputted from the image capture device 120 as a modified pixel row (step 745).

In some embodiments, parallel architecture can be used to speed up the shift and add process. For example, the four temporary registers 305, 310, 315, 320 can be concurrently multiplexed, shifted, and added into accumulator register 355 by providing additional hardware to steps 720, 725, and 730 and executing the steps 720, 725, 730 in parallel. Another example, step 710 can select and move the next four pixel rows into a duplicate set of temporary registers 305, 310, and 315, and 320 while steps 720, 725, 730, 735, 740 are operating on the current four pixel rows.

In still other embodiments, the shift and add function can be implements outside an image capture device using pixel data read from the image capture device. The shift and add function can be performed by a computer using a processor to execute software that implements the shift and add function as described above in software. Other embodiments use hardware, external to an image capture device, that implements the shift and add function on data being read from the image capture device. Both of these embodiments use a standard image capture devices but allow the use of a shift and add function to process pixel data read from the image capture device.

While the invention is disclosed in the context of an image capture device used to read optical codes, it will be recognized that a wide variety of implementations may be employed by a person of ordinary skill in the art consistent with the above discussion and the claims, which follow below. In addition, the image capture device 120 can be used in other functions not associated with bar code recognition.

What is claimed is:

1. A method implemented in an image capture device for modifying and outputting pixel data from the image capture device, the method comprising:

receiving a command to modify pixel data where the pixel data is stored in a pixel array in the image capture device and where the command includes information used by the image capture device to control modification of the pixel data;

selecting a plurality of sequential rows of pixel data from the pixel array;

shifting each pixel in at least one row of pixel data from the plurality of sequential rows of pixel data by a number of pixel columns where the information in the received command determines for each row of pixels, from the plurality of sequential rows of pixel data, the number of pixel columns to shift each pixel in each pixel row;

adding corresponding columns of pixels data from all the rows of the plurality of sequential rows of pixel data, after shifting each pixel, to generate a first modified row of pixel data; and outputting the pixel data from the first modified row of pixels.

2. The method of claim 1 further comprising:
receiving a command to read a first row of pixel data from the image capture device.

3. The method of claim 2 wherein selecting a plurality of sequential rows of pixel data includes selecting the first row of pixel data.

4. The method of claim 1, wherein the pixel data in at least one row of pixels in the plurality of sequential rows of pixel data is not shifted.

5. The method of claim 1, wherein the pixels of one row of pixel data in the plurality of sequential rows of pixel data are shifted a different number of pixel columns from the pixels in at least one other row in the plurality of sequential rows of pixel data.

6. The method of claim 1 further comprising:
repeating the shifting and adding of the pixels from the plurality of sequential rows of pixel data using the information in the received command to determine for each row of pixel data, from the plurality of sequential rows of pixel data, the number of pixel columns to shift each pixel in the row to produce a second modified row of pixel data that is different from the first modified row of pixel data; and outputting the pixel data from the second modified row of pixel data.

7. An image capture device comprising:
a pixel array organized into rows and columns of pixel data;
an external interface used to send and receive commands, data and pixel data;
timing and control logic that controls the operation of the image capture device using commands and data received through the external interface where the timing and control logic includes shift and add logic used to modify pixel data; and
where the timing and control logic after receiving a shift and add command, generates a first modified pixel row by selecting a plurality of pixel rows and adding the pixel data, by column, from each of the plurality of pixel rows after each pixel of at least one of the plurality of pixel rows has been shifted by at least one column.

8. The device of claim 7, wherein the external interface transfers the pixel data from the first modified pixel row externally to the image capture device.

9. The device of claim 8, wherein the external interface transfers the pixel data from the first modified pixel row in response to receiving a read command that causes at least one row of pixel data to be read from the pixel array.

10. The device of claim 9, wherein the plurality of pixel rows includes the at least one row of pixel data.

11. The device of claim 10 wherein the shift and add command includes data used by the timing and control logic to determine the number of columns to shift pixels in each of the selected pixel rows.

12. The device of claim 11, wherein the shift and add command includes further data causing the timing and control logic to generate a second modified pixel row using the plurality of pixel rows and adding the pixel data, by column, from each of the plurality of pixel rows after each pixel of at least one of the plurality of pixel rows has been shifted by at least one column where for at least one of the plurality of pixel rows, the number of columns each pixel is shifted is different from the number of shifted columns used to generate the first modified pixel row.

13. The device of claim 12, wherein the external interface transfers the pixel data from the second modified pixel row externally to the image capture device in response to the read command.

14. An optical code image scanning system comprising:
optical code image scanner comprising
a processing module; and
an image capture device comprising:
a pixel array organized into rows and columns of pixel data;
an external interface used to send and receive commands, data and pixel data;
timing and control logic that controls the operation of the image capture device using commands and data received through the external interface; and
where the timing and control logic after receiving a shift and add command, generates a first modified pixel row by selecting a plurality of pixel rows and adding the pixel data, by column, from each of the plurality of pixel rows after each pixel of at least one of the plurality of pixel rows has been shifted by at least one column.

15. The system of claim 14, wherein the external interface transfers the pixel data from the first modified pixel row externally to the image capture device.

16. The system of claim 14, wherein the external interface transfers the pixel data from the first modified pixel row in response to receiving a read command that causes at least one row of pixel data to be read from the pixel array.

17. The system of claim 16, wherein the plurality of pixel rows includes the at least one row of pixel data.

18. The system of claim 17, wherein the shift and add command includes data used by the timing and control logic to determine the number of columns to shift pixels in each of the selected pixel rows.

19. The device of claim 18, wherein the shift and add command includes further data causing the timing and control logic to generate a second modified pixel row using the plurality of pixel rows and adding the pixel data, by column, from each of the plurality of pixel rows after each pixel of at least one of the plurality of pixel rows has been shifted by at least one column where for at least one of the plurality of pixel rows, the number of columns each pixel is shifted is different from the number of shifted columns used to generate the first modified pixel row.

20. The device of claim 19, wherein the external interface transfers the pixel data from the second modified pixel row externally to the image capture device in response to the read command.

21. A computer implemented method for modifying pixel data, the method comprising:
selecting a plurality of sequential rows of pixel data stored in a memory;
shifting each pixel in at least one row of pixel data from the plurality of sequential rows of pixel data by a number of pixel columns where the information in the received command determines for each row of pixel data, from the plurality of sequential rows of pixels, the number of pixel columns to shift each pixel of the row;

adding corresponding columns of pixels data from all the rows of the plurality of sequential rows of pixel data, after shifting each pixel, to generate a first modified row of pixel data; and outputting the pixel data from the first modified row of pixel data.

* * * * *